United States Patent
Perez et al.

(10) Patent No.: US 7,492,686 B2
(45) Date of Patent: Feb. 17, 2009

(54) FLEXIBLE MULTIPULSE GENERATOR

(75) Inventors: Miguel Gabino Perez, Mountain View, CA (US); Alexander Fairgrieve, Menlo Park, CA (US); Akihiro Asada, Chigasaki (JP)

(73) Assignee: Intersil Americas Inc., Milpitas, CA (US)

( * ) Notice: Subject to any disclaimer, the term of this patent is extended or adjusted under 35 U.S.C. 154(b) by 539 days.

(21) Appl. No.: 11/233,193

(22) Filed: Sep. 22, 2005

(65) Prior Publication Data

US 2006/0280089 A1    Dec. 14, 2006

Related U.S. Application Data

(60) Provisional application No. 60/700,136, filed on Jul. 18, 2005, provisional application No. 60/700,135, filed on Jul. 18, 2005, provisional application No. 60/687,225, filed on Jun. 3, 2005, provisional application No. 60/685,580, filed on May 26, 2005.

(51) Int. Cl.
*G11B 5/09* (2006.01)
(52) U.S. Cl. .................................. 369/59.11
(58) Field of Classification Search ............ 369/59.11, 369/116, 59.12
See application file for complete search history.

(56) References Cited

U.S. PATENT DOCUMENTS

| 5,757,735 | A  | * | 5/1998 | Fitzpatrick et al. ....... 369/13.54 |
| 6,414,932 | B1 |   | 7/2002 | Kaku et al. |
| 6,442,118 | B1 |   | 8/2002 | Hoshino et al. |
| 6,483,791 | B1 |   | 11/2002 | Asada et al. |
| 6,552,987 | B1 |   | 4/2003 | Asada et al. |
| 6,683,823 | B2 |   | 1/2004 | Saga et al. |
| 6,721,255 | B1 |   | 4/2004 | Gushima et al. |
| 2003/0090971 | A1 | * | 5/2003 | Gushima et al. ............ 369/47.3 |
| 2003/0117923 | A1 | * | 6/2003 | Asada et al. ............. 369/59.11 |

* cited by examiner

*Primary Examiner*—Andrea L Wellington
*Assistant Examiner*—Aneeta Patankar
(74) *Attorney, Agent, or Firm*—Fliesler Meyer LLP

(57) ABSTRACT

Embodiments of the present invention relate to systems and methods for providing flexible multipulse strategies. In specific embodiments, a plurality of multipulse location registers are dedicated to storing multipulse location information. Each of a plurality of different mark-lengths that can result in at least one multipulse is mapped to one or more bit location within the multipulse location registers, such that a unique multipulse execution strategy can be defined for each of the plurality of different mark-lengths. Each bit location within the multipulse location registers can contain a first type of bit or a second type of bit. The first type of bit is used to indicate where to execute a multipulse, and the second type of bit is used to indicate where to not execute a multipulse. This abstract is not intended to be a complete description of the various embodiments of the present invention.

16 Claims, 10 Drawing Sheets

FIG. 4A (multipulse location registers)

Arrows from top pointing to columns indicate: (14 mark), (11 mark), (10 mark), (9 mark), (8 mark), (7 mark), (6 mark), (5 mark), (4 mark) — the (14 mark) arrow points to both bit 7 and bit 6 of the top register.

| | bit 7 (MSB) | bit 6 | bit 5 | bit 4 | bit 3 | bit 2 | bit 1 | bit 0 (LSB) |
|---|---|---|---|---|---|---|---|---|
| Reg. n+9 | x | x | x | x | x | | | |
| Reg. n+8 | x | | | | | | | |
| Reg. n+7 | | x | | | | | | |
| Reg. n+6 | x | x | | | | | | |
| Reg. n+5 | x | x | x | | | | | |
| Reg. n+4 | x | x | x | x | | | | |
| Reg. n+3 | x | x | x | x | x | | | |
| Reg. n+2 | x | x | x | x | x | x | | |
| Reg. n+1 | x | x | x | x | x | x | x | |
| Reg. n | x | x | x | x | x | x | x | |

FIG. 4B (multipulse location registers)

| | B7 (MSB) | B6 | B5 | B4 | B3 | B2 | B1 | B0 (LSB) |
|---|---|---|---|---|---|---|---|---|
| Reg. n+5 | 4 mark | | 11 mark | | | | | |
| Reg. n+4 | 5 mark | | | 10 mark | | | | |
| Reg. n+3 | 6 mark | | | | 9 mark | | | |
| Reg. n+2 | | | | | | 8 mark | | |
| Reg. n+1 | 7 mark | | | | 14 mark [10:3] | | | |
| Reg. n | | | | | | 14 mark [2:0] | | enable |

| TSMP (12T+) | TEMP (12T+) |
|---|---|
| TSMP (11T) | TEMP (11T) |
| TSMP (10T) | TEMP (10T) |
| TSMP (9T) | TEMP (9T) |
| TSMP (8T) | TEMP (8T) |
| TSMP (7T) | TEMP (7T) |
| TSMP (6T) | TEMP (6T) |
| TSMP (5T) | TEMP (5T) |
| TSMP (4T) | TEMP (4T) |

FIG. 5A
multipulse start/end parameters
in timing memory

| TSMP (12T+) | TEMP (12T+) |
|---|---|
| TSMP (5-11T) | TEMP (5-11T) |
| TSMP (4T) | TEMP (4T) |

FIG. 5B
multipulse start/end parameters
in timing memory

| | |
|---|---|
| bit 7 (MSB) | Force 6 + marks on all NRZ patterns (1 = yes) |
| bit 6 | Reserved |
| bit 5 | EFM Code (1) / 17PP Code (0) |
| bit 4 | Mode A (1) / Mode B (0) |
| bit 3 | Force 6 + spaces on all NRZ patterns (1 = yes) |
| bit 2 | NRZ array select (MSB) |
| bit 1 | NRZ array select |
| bit 0 (LSB) | NRZ array select (LSB) |

FIG. 6 (Write Stategy Control Register)

| Bit2 | Bit1 | Bit0 | NRZ array mode |
|---|---|---|---|
| 0 | 0 | 0 | 4 x 4 Array |
| 0 | 0 | 1 | 5 x 3 Array |
| 0 | 1 | 0 | Use mark length only |
| 0 | 1 | 1 | Reserved |
| 1 | 0 | 0 | Reserved |
| 1 | 0 | 1 | Reserved |
| 1 | 1 | 0 | Reserved |
| 1 | 1 | 1 | Reserved |

FIG. 7 (Array Selection Bits (bits2-0))

- 4x4 Arrays with EFM code
Space to Mark Parameters (TSFP, TEFP, TMFP, TEER)

|  | 3Tm | 4Tm | 5Tm | 6Tm+ |
|---|---|---|---|---|
| 3Ts | X0h | X1h | X2h | X3h |
| 4Ts | X4h | X5h | X6h | X7h |
| 5Ts | X8h | X9h | XAh | XBh |
| 6Ts+ | XCh | XDh | XEh | XFh |

FIG. 8A

Mark to Space Parameters (TSLP, TELP, TEMPP', TECP)

|  | 3Ts | 4Ts | 5Ts | 6Ts+ |
|---|---|---|---|---|
| 3Tm | X0h | X1h | X2h | X3h |
| 4Tm | X4h | X5h | X6h | X7h |
| 5Tm | X8h | X9h | XAh | XBh |
| 6Tm+ | XCh | XDh | XEh | XFh |

FIG. 8B

- 4x4 Arrays with 17PP code
Space to Mark Parameters (TSFP, TEFP, TMFP, TEER)

|  | 2Tm | 3Tm | 4Tm | 5Tm+ |
|---|---|---|---|---|
| 2Ts | X0h | X1h | X2h | X3h |
| 3Ts | X4h | X5h | X6h | X7h |
| 4Ts | X8h | X9h | XAh | XBh |
| 5Ts+ | XCh | XDh | XEh | XFh |

FIG. 9A

Mark to Space Parameters (TSLP, TELP, TEMPP, TECP)

|  | 2Ts | 3Ts | 4Ts | 5Ts+ |
|---|---|---|---|---|
| 2Tm | X0h | X1h | X2h | X3h |
| 3Tm | X4h | X5h | X6h | X7h |
| 4Tm | X8h | X9h | XAh | XBh |
| 5Tm+ | XCh | XDh | XEh | XFh |

FIG. 9B

FIG. 10A - 5X3 Arrays with EFM code
Space to Mark Parameters (TSFP, TEFP, TMFP, TEER)

|       | 3Tm | 4Tm | 5Tm | 6Tm+even | 7+Tm odd |
|-------|-----|-----|-----|----------|----------|
| 3Ts   | X0h | X1h | X2h | XCh      | X3h      |
| 4Ts   | X4h | X5h | X6h | XDh      | X7h      |
| 5Ts+  | X8h | X9h | XAh | XEh      | XBh      |

FIG. 10B Mark to Space Parameters (TSLP, TELP, TEMPP, TECP)

|          | 3Ts | 4Ts | 5Ts+ |
|----------|-----|-----|------|
| 3Tm      | X0h | X1h | X2h  |
| 4Tm      | X4h | X5h | X6h  |
| 5Tm      | X8h | X9h | XAh  |
| 6Tm+ even| X7h | XBh | XFh  |
| 7Tm+ odd | XCh | XDh | XEh  |

FIG. 11A - 5X3 Arrays with 17PP code
Space to Mark Parameters (TSFP, TEFP, TMFP, TEER)

|       | 2Tm | 3Tm | 4Tm | 5Tm+ odd | 6+Tm even |
|-------|-----|-----|-----|----------|-----------|
| 2Ts   | X0h | X1h | X2h | X3h      | XCh       |
| 3Ts   | X4h | X5h | X6h | X7h      | XDh       |
| 4Ts+  | X8h | X9h | XAh | XBh      | XEh       |

FIG. 11B Mark to Space Parameters (TSLP, TELP, TEMPP, TECP)

|           | 2Ts | 3Ts | 4Ts+ |
|-----------|-----|-----|------|
| 2Tm       | X0h | X1h | X2h  |
| 3Tm       | X4h | X5h | X6h  |
| 4Tm       | X8h | X9h | XAh  |
| 5Tm+ odd  | XCh | XDh | XEh  |
| 6Tm+ even | X7h | XBh | XFh  |

FIG. 12A — Mark-length only with EFM code
Space to Mark Parameters (TSFP, TEFP, TMFP, TEER)

| 3m | 4m | 5m | 6m | 7m | 8m | 9m | 10m | 11m | 12+m |
|---|---|---|---|---|---|---|---|---|---|
| X0h | X1h | X2h | X8h | X9h | XAh | XBh | XCh | XDh | XEh |

FIG. 12B — Mark to Space Parameters (TSIP, TELP, TEMPP, TECR)

| 3m | 4m | 5m | 6m | 7m | 8m | 9m | 10m | 11m | 12+m |
|---|---|---|---|---|---|---|---|---|---|
| X4h | X5h | X6h | X8h | X9h | XAh | XBh | XCh | XDh | XEh |

FIG. 13A — Mark-length only with 17PP code
Space to Mark Parameters (TSFP, TEFP, TMFP, TEER)

| 2m | 3m | 4m | 5m | 6m | 7m | 8m | 9m | 10m | 11m | 12+m |
|---|---|---|---|---|---|---|---|---|---|---|
| X0h | X1h | X2h | X3h | X8h | X9h | XAh | XBh | XCh | XDh | XEh |

FIG. 13B — Mark to Space Parameters (TSIP, TELP, TEMPP, TECR)

| 2m | 3m | 4m | 5m | 6m | 7m | 8m | 9m | 10m | 11m | 12+m |
|---|---|---|---|---|---|---|---|---|---|---|
| X4h | X5h | X6h | X7h | X8h | X9h | XAh | XBh | XCh | XDh | XEh |

FLEXIBLE MULTIPULSE GENERATOR

PRIORITY CLAIM

The present application claims priority to the following provisional applications under 35 U.S.C. §119(e): 60/685,580 filed May 26, 2005; 60/687,225 filed Jun. 3, 2005; 60/700,135 flied Jul. 18, 2005; and 60/700,136 filed Jul. 18, 2005.

FIELD OF THE INVENTION

The present invention relates to a technology for recording information onto an information recording medium, such as an optical disk.

BACKGROUND

In the field of products concerning the optical disk such as CD, DVD and the like, there is a tendency to increase both the storage capacity, and the speed of data transfer in order to be competitive and capture market share. Also, with the capacity of the optical disk increased, marks and spaces (corresponding to a representation of the 1s and 0s of information) to be formed on the optical disk are smaller and more precise, and the formation of such fine marks and spaces is required to be more flexible and accurate in the optical disk apparatus.

Factors such as media type, writing speed, disc format and drive optics necessitate particular write strategies, which are used to write the marks and spaces. In general, the writing of marks on a disk can be considered to compose of the first pulse which defines the starting edge of a mark, multipulses which fill the center of a mark, and the last pulse which defines the ending edge of a mark. A key portion of the write strategy is the definition of multipulse locations and timing in response to NRZ input data (or NRZI input data).

Previous write strategy generators were very limited with regards to how multipulses can be defined. For example, for CD and DVD, the minimum mark length is 3 T, and longer marks are 4 T, 5 T, 6 T, etc, up to 14 T. A 3 T mark would be formed with a single pulse which would define both the leading and tailing edges of the 3 T mark. The reason only one pulse would be used is that the laser spot size is comparable to the size of the 3 T mark itself. A 4 T mark would typically be defined by either one large pulse, or two small pulses. A 5 T mark would be defined either by two or 3 pulses. If it was composed of three pulses, the center pulse would be a multipulse. A 6 T mark would be composed of 3 or 4 pulses, with either 1 or 2 multipulses. A key restriction of early write strategies is that one and only one multipulse strategy could be programmed for each mark length. Thus they were called "1 T multipulse strategies". However, as optical drives increased in speed, the media was not fast enough to respond to a 1 T multipulse strategy, nor was there enough time to bring the drive currents up and down in the low nanosecond intervals required to implement the 1 T multipulse strategy. Accordingly, a "2 T multipulse strategy" began to be used, where a multipulse is placed every other T between a first and last pulse of a mark, with the multipulse pattern optionally being different for even mark-lengths than for odd mark-lengths. However, other "custom" multipulse strategies are sometimes desired, potentially requiring that custom chips be designed, which is typically not cost effective. Accordingly, given the variety of existing and prospective write strategies in the market, it is desirable to provide for greater flexibility in defining multipulses. From a design point of view, efficiency and compactness of the implementation are important considerations.

Other key portions of a write strategy include definitions of the first pulse and last pulse in response to NRZ input data, as well as the modulation code that is used. The modulation code for CD and DVD used EFM, or enhanced EFM, both of which have marks of 3 T, 4 T, etc. But Blue recording media has a modified 17PP code which has marks of 2 T, 3 T, 4 T, etc. As mentioned earlier, there is also desire for some flexibility in choosing when and how many multipulses to fit within a given mark as well.

In addition to this, there is an issue that has to do with the influence of size of the spaces surrounding a mark to the strategy itself. For instance, if a mark is preceded by a 3 T space, the optical and thermal history before the first pulse would dictate that the position of the first pulse be changed depending on both the size of the mark, and the size of the preceding space. Likewise, the timing of the last pulse would be influenced by the size of the mark and the following space. This led to a array of programmable pulse start and duration times for the first and last pulses. Ideally, the array would cover all mark and space sizes from 2 T through 14 T. But in practice, this requires excessive programming space and time. So the array is typically shortened to a 4×4 array that includes 3 Tm, 4 Tm, 5 Tm, 6 Tm, and the corresponding 3 Ts, 3 Ts, 4 Ts, and 5 Ts, where Tm means length of a mark in T's, and Ts means length of a space in T's. However, this 4×4 array was not always desired by a customer, which may result in a custom chip being designed. Accordingly, it would be useful if the array arrangement were more flexible, thereby not requiring a new design each time a customer wanted to redefine the array.

Typically, a write strategy generator will only offer one or two combinations of such modulation codes and timing modes, as well as only one way of organizing data that defines parameters such as the first and last pulse of a mark. Again, greater flexibility in selecting combinations of modulation codes and timing modes, as well as in organizing the data that defines write strategy parameters (such as first and last pulse of a mark) is desirable, to thereby reduce the need for custom chips. From a design point of view, efficiency and compactness of the implementation are again important considerations.

SUMMARY OF THE INVENTION

Embodiments of the present invention are directed to laser driver systems that provides flexible multipulse strategies. Such a laser driver system can include a mark/space detector, a sequencer and a plurality of multipulse location registers. The mark/space detector is configured to detect mark-lengths and space-lengths in an NRZ signal, and to provide such information to the sequencer. The plurality of multipulse location registers are dedicated to storing multipulse location information, wherein each of a plurality of different mark-lengths that can result in at least one multipulse location is mapped to one or more bit locations within the multipulse location registers, such that a unique multipulse execution strategy can be defined for each of the plurality of different mark-lengths. Each bit location within the multipulse location registers can contain a first type of bit (e.g., a "1") or a second type of bit (e.g., a "0"), wherein the first type of bit indicates where to execute a multipulse, and the second type of bit indicates where to not execute a multipulse.

In accordance with embodiments of the present invention, timing memory stores TSMP (time start of multipulse) and TEMP (time end of multipulse) parameters. These parameters define the timing of the rising and falling edges of the multipulses. Unique TSMP and TEMP parameters are stored, within the timing memory, for each of the plurality of different mark-lengths that can result in at least one multipulse.

In response to receiving information indicative of a mark-length from the mark/space detector, the sequencer accesses one or more bit location within the multipulse location registers, in order to implement the multipulse execution strategy that corresponds to the mark-length. The sequencer also accesses the timing memory in order to determine the TSMP and TEMP timing parameters that correspond to the mark-length.

In accordance with embodiments of the present invention, a portion of the timing memory is dedicated to storing space-to-mark and mark-to-space event parameters that define a first pulse and a last pulse of a mark. (An event is defined as a change in the write current, which occurs when the timer executes the timing of the timing parameter. The term event is used because both a timing parameter is executed, and a write current parameter is executed simultaneously.) A write strategy control register includes a plurality of bits that are used to specify how the aforementioned portion of timing memory is organized. For example, this portion of timing memory can be organized as 4 mark by 4 space (4×4), 5 mark by 3 space (5×3) and mark-length-only arrays, wherein the bits within the write strategy control register can be used to select among the arrays.

The write strategy control register also includes at least one bit that is used to specify either a mode-A or a mode-B timing mode. In mode-A, a first multipulse location begins on the 1st T of a mark, and in mode-B a first multipulse begins on the 2nd T of a mark. The mode A timing makes it easier to have one more multi-pulse between the first and last pulse, than the mode B timing. Additionally, the write strategy control register also includes at least one bit that is used to specify one of at least two modulation codes.

In accordance with embodiments of the present invention, the write strategy control register enables a selection of different combinations of timing memory organization, timing mode and modulation code. In other words, the write strategy control register enables a selection of one of at least two different ways in which timing memory is organized, whether a first multipulse location begins on the 1st T of a mark or on the 2nd T of a mark, and whether a first or a second modulation code is used when writing.

This summary is not intended to be a complete description of the various embodiments of the present invention. Further and alternative embodiments, and the features, aspects, and advantages of the present invention will become more apparent from the detailed description set forth below, the drawings and the claims.

BRIEF DESCRIPTION OF THE DRAWINGS

FIGS. 4A and 4B illustrate how the registers shown in FIG. 2 can be used to for the purpose of indicating on which T positions to execute multipulses, for various mark lengths, in accordance with an embodiment of the present invention. Other bit arrangements are possible.

FIGS. 5A and 5B illustrate how the timing memory shown in FIG. 2 can be used to define a different TSMP (time start multipulse) and TEMP (time end multipulse) for each mark-length of 4 T or greater, or for different subgroups of mark-lengths of 4 T or greater.

FIG. 6 illustrates an exemplary write strategy control register, according to an embodiment of the present invention.

FIG. 7 is useful for explaining how bits [2:0] of the write strategy control register shown in FIG. 6 can be used to select one of a plurality of different arrangements (arrays) in which space-to-mark and mark-to-space parameters can be arranged.

FIG. 8A illustrates an exemplary 4×4 array with EFM code for space-to-mark parameters (TSFP, TEFP, TMFP and TEER). FIG. 8B illustrates an exemplary 4×4 array with EFM code for mark-to-space parameters (TSLP, TELP, TEMPP and TECP).

FIG. 9A illustrates an exemplary 4×4 array with 17PP code for space-to-mark parameters (TSFP, TEFP, TMFP and TEER). FIG. 9B illustrates an exemplary 4×4 array with 17PP code for mark-to-space parameters (TSLP, TELP, TEMPP and TECP).

FIG. 10A illustrates an exemplary 5×3 array with EFM code for space-to-mark parameters (TSFP, TEFP, TMFP and TEER). FIG. 10B illustrates an exemplary 5×3 array with EFM code for mark-to-space parameters (TSLP, TELP, TEMPP and TECP).

FIG. 11A illustrates an exemplary 5×3 array with 17PP code for space-to-mark parameters (TSFP, TEFP, TMFP and TEER). FIG. 11B illustrates an exemplary 5×3 array with 17PP code for mark-to-space parameters (TSLP, TELP, TEMPP and TECP).

FIG. 12A illustrates an exemplary mark-length-only array with EFM code for space-to-mark parameters (TSFP, TEFP, TMFP and TEER). FIG. 12B illustrates an exemplary mark-length-only array with EFM code for mark-to-space parameters (TSLP, TELP, TEMPP and TECP).

FIG. 13A illustrates an exemplary mark-length-only array with 17PP code for space-to-mark parameters (TSFP, TEFP, TMFP and TEER). FIG. 13B illustrates an exemplary mark-length-only array with 17PP code and for mark-to-space parameters (TSLP, TELP, TEMPP and TECP).

DETAILED DESCRIPTION

Embodiments of the present invention relate to recordable optical disk drives, and in particular to laser driver integrated circuits for controlling pulse-segmented laser drive waveforms of multi-valued levels, or more in particular to laser driver integrated circuits and optical disk drives with a laser driver integrated circuit mounted thereon, in which the operation can be switched at high speed and high accuracy in keeping with various drive waveforms.

Figure 1:
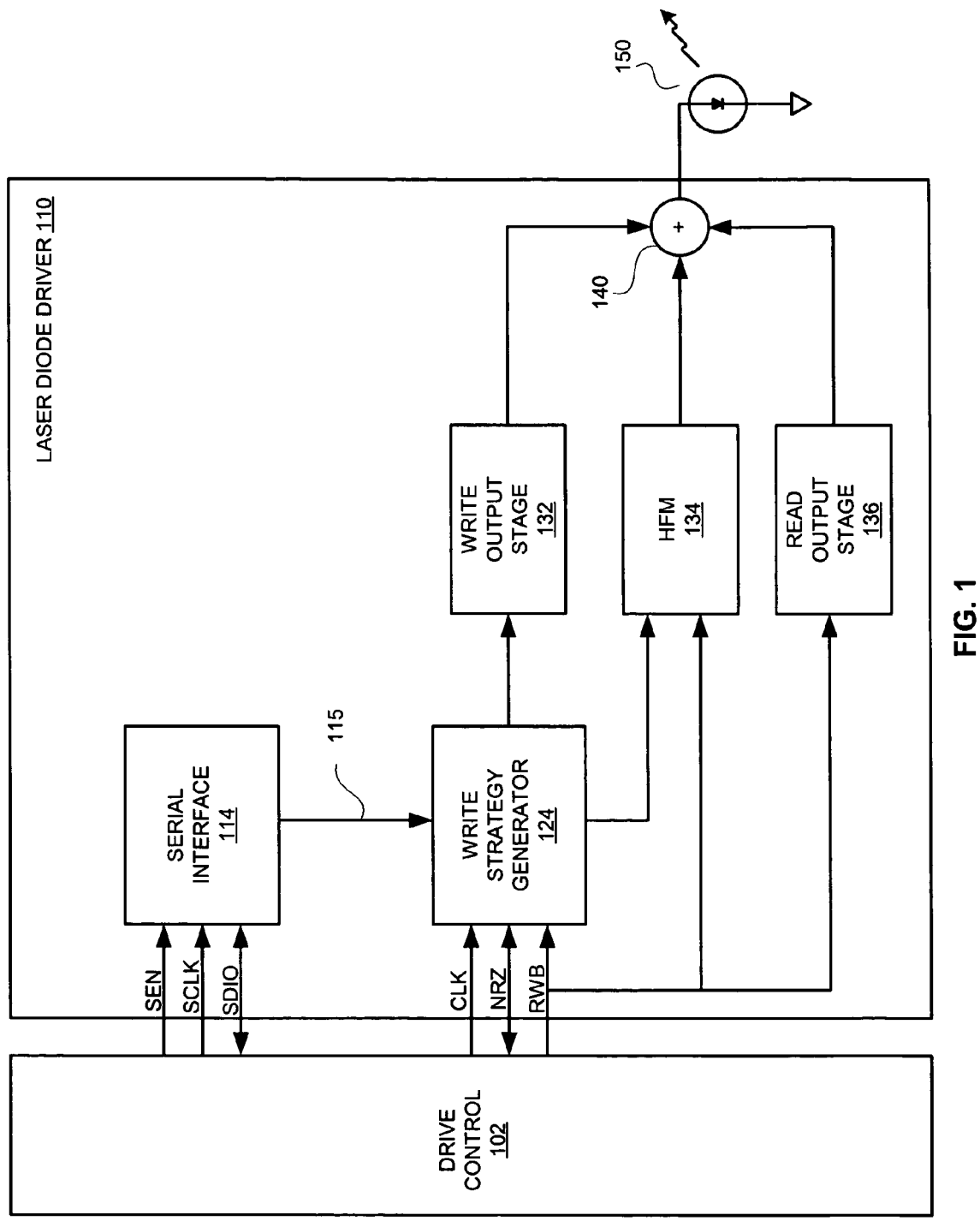
FIG. 1 is a high level diagram of an exemplary laser driver.

FIG. 1 is a high level diagram showing a laser driver 110 of a data storage device in communications with a drive controller 102 (e.g., a host). The data storage device can be, for example, an optical storage device that includes an optical disk upon which user data can be stored. The laser driver 110 drives a laser diode 150 in order to read data from, and write data to, the optical disk. In the exemplary environment shown, the laser driver 110 is shown as including a write strategy generator 124 and a serial interface 114 that can provide write strategy information 115 (e.g., updates) to the write strategy generator 124. In accordance with specific embodiments of the present invention, the drive controller 102 can provide write strategy updates to the laser driver 110, via the serial interface 114, and such updates can be used to update registers and memory within the write strategy generator 124.

The laser driver 110 is also shown as including a write output stage 132, a high frequency modulation (HFM) circuit 134 and a read output stage 136, the outputs of which are added by a summing node 140. The write output stage 132 includes at least one write digital-to-analog converter (DAC), and other circuitry used to convert the digital output of the write strategy generator 124 to an analog write signal. The HFM circuit 134 is used to provide a high frequency current to the laser diode 150 during reading. The read output stage 136 includes at least one write DAC that converts a digital read signal to an analog read signal.

The drive controller 102 is shown as providing a serial enable (SEN) signal and a serial clock (SCLK) signal to the serial interface 114 of the laser driver 110. Additionally, a bi-directional serial data input/output (SDIO) line allows the drive controller 102 to write data to and read data from registers or memory locations within the laser driver 110. For example, write strategy updates can be provided over the SDIO line. The drive controller 102 is also shown as providing a data clock (CLK) and a read write direction signal (RWB) to the laser driver 110. For example, a LOW RWB signal can designate WRITE, and a HIGH RWB signal can designate READ, or vice versa. A data line is labeled NRZ (Non-Return-to-Zero). The communications between the drive controller 102 and laser driver 110 are likely to occur over a flexible cable, also known as a flex cable.

Figure 2:
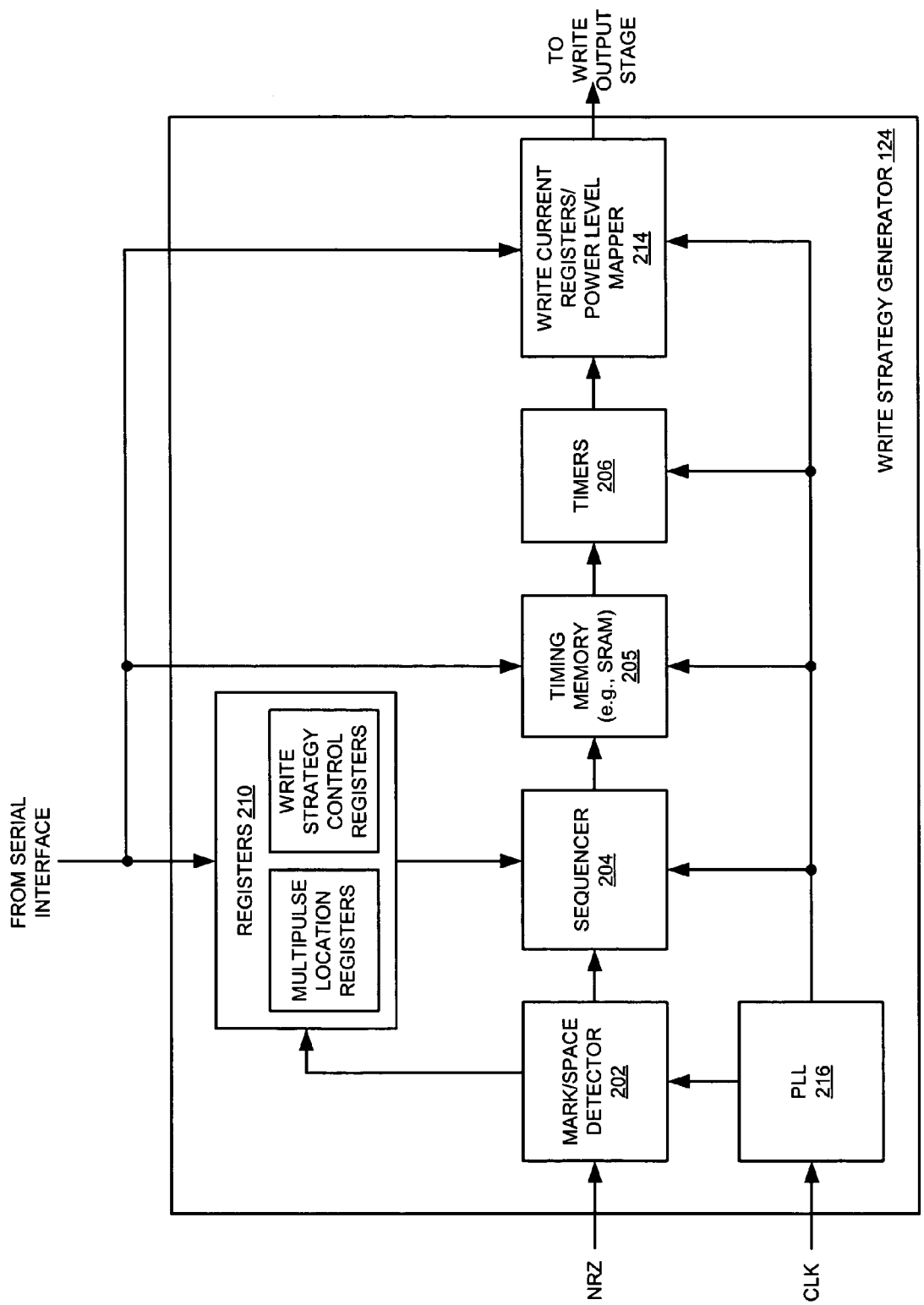
FIG. 2 is a high level diagram showing a write strategy generator of the laser driver shown in FIG. 1.

Referring now to FIG. 2, the write strategy generator 124 is shown as including a mark/space detector 202, a sequencer 204, timing memory 205, timers 206, registers 210 and write current registers 214. The mark/space detector 202 detects mark-lengths and space lengths from the NRZ or NRZI signal (collectively referred to hereafter as an NRZ signal). The sequencer 204, e.g., implemented by a microprocessor, state machine, etc. schedules output power transitions relative to the mark-space positions in accordance with a write strategy mode that is selected. Exemplary write strategy modes, which are not meant to be limiting, include: mode-A, mode-B, CD-2 T, 17PP Blue Ray, and 17PP with 2 T. One of the plurality of different write strategy modes can be selected using the control registers 210, as will be describe in more detail below. The timing of each power transition edge is provided by timers 206, which are controlled via timing memory 205. There may be more than one timer 206 (e.g., there may be four timers). Additionally, the write current registers 214 store write current levels for each possible event. Such write current registers 214, which may also be referred to hereafter as event power registers, may include first pulse current, middle pulse current, etc, and land and groove register banks, for example. The registers 210 include multipulse location registers and control/status registers. The timing memory 205 can specify a time delay of each timer 206 for each type of space-mark-space sequence, and each type of pulse. The contents of registers 210 and 214, and of the timing memory 205, can be modified using the serial interface 114, as mentioned above.

The timers 206, which are used to produce mark-space edges on the optical disk surfaces of the storage device, lie dormant until started. The sequencer 204 accesses timing memory 205, which feeds and starts the timers 206 at the appropriate time references to the mark-space edges. Each possible event, such as Time Start First Pulse (TSFP), Time End First Pulse (TEFP), etc., is defined to have a timing component and in a power or amplitude component. The sequencer 204 queues events at appropriate intervals to generate desired write strategy waveforms. The timers 206 control when a queued event actually occurs. The sequencer 204 accesses the timing memory 205 to load the timers 206 upon receiving specific NRZ data stimulus. After the timer counts down to zero, the write current registers 214 are triggered to output an appropriate power level value. In general, during a mark section, the laser power is modulated to produce pulses (including multipulses) that are used for driving the laser diode 150. While in a space section, a laser diode 150 is driven with the power (smaller than the power for mark recording) for erasing the mark and space previously recorded in the medium, or simply reading over the space section of write once media.

Flexible Multipulse

Figure 3A:
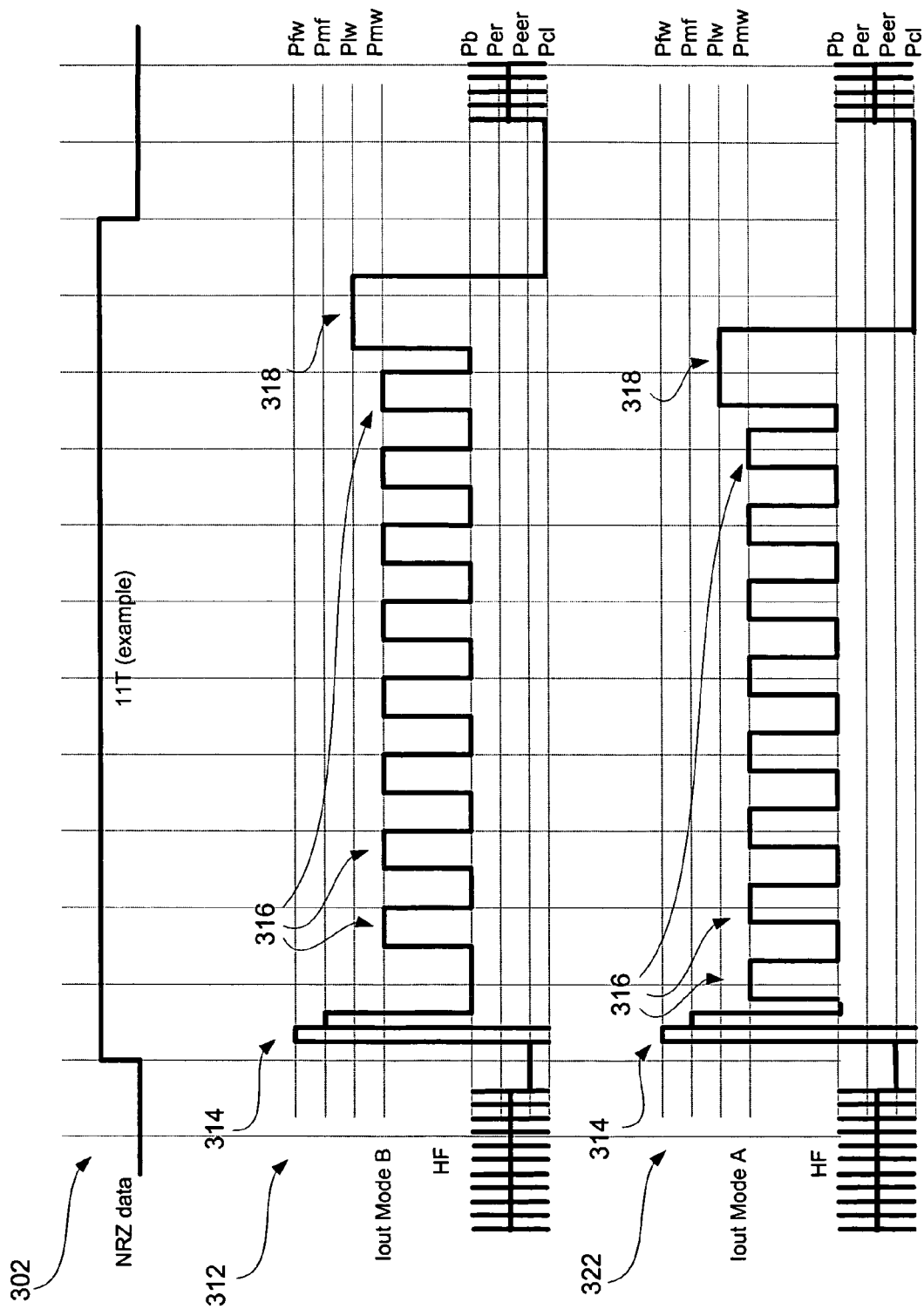
FIG. 3A is a diagram showing exemplary drive waveforms for a mark-length of 11 T, which may be generated by a laser driver.

FIG. 3A is a diagram showing exemplary drive waveforms for a mark-length of 11 T, where T is defined as a minimum unit for determining the mark and space lengths and corresponds, e.g., to the period of a so-called channel clock chCLK. More specifically, at the top of FIG. 3A is an NRZ data signal 302 that is high for 11 T. A first exemplary drive signal 312 generated in response to the NRZ signal 302 is shown as including a first pulse 314, a last pulse 318, and eight multipulses 316 therebetween. As can be appreciated from FIG. 3A, the multipulses are the middle pulses of a laser drive waveform, issued between the first pulse and last pulse of a mark. Great flexibility in defining multipulses is a compelling feature of a write-strategy laser driver, given the variety of existing and prospective write strategies on the market.

In the example shown, a portion of the first pulse 314 has an amplitude corresponding to Pfw (first write power), and a further portion of the first pulse 314 has an amplitude corresponding to Pmf (middle first power). The last pulse has an amplitude Plw (last write power). The multipulses 316 have an amplitude corresponding to Pmw (multipulse write power). Following the last pulse 318, the power drops to Pcl (cool power). A second exemplary drive signal 322 is similar to the drive signal 312, except that signal 312 is a mode-B signal, and signal 322 is a mode-A signal. The only difference between the two signals 312 and 322 is that in mode-A the multipulses are shown as starting on the 1st T of the mark, where in mode-B, the multipulses are shown as starting on the 2nd T of the mark.

In accordance with an embodiment, the number of possible multipulses is equal to the mark-length minus three. Thus, for a mark-length of 11 T (as in this example), there can be up to 8 multipulses; for a mark-length of 10 T, there can be up to 7 multipulses; ... and for a mark-length of three or less, there are no multipulses.

As mentioned above, previous write strategy generators were very limited with regards to how multipulses could be defined. However, other "custom" multipulse strategies were sometimes desired, leading to the design of "custom" chips, which is typically not cost effective. Accordingly, to avoid the requirement for custom chips, specific embodiments of the present invention were developed, to allow for numerous unique multipulse strategies using a common chip, as will be explained below. Because of their flexibility, such embodiments of the present invention will sometimes be referred to as a flexible multipulse strategies.

In accordance with specific embodiments of the present invention, a flexible multipulse strategy is implemented using a set of registers that are mapped such that at least N-3 register bits (were N is the mark-length) are associated with each possible mark-length, for the purpose of indicating on which T positions to execute multipulses for the mark-length. (T is a minimum unit time of change of the binary recording signal NRZ and corresponds, e.g., to a period of the clock CLK or fraction or multiple thereof). For example, 8 register bits are associated with an 11 T mark for the purpose of indicating on which of 8 T positions to execute a mutlipulse when writing an 11 T mark. For another example, 7 register bits are associated with a 10 T mark for the purpose of indicating on which 7 T positions to execute a mutlipulse when writing a 10 T mark. For a 4 T mark, 1 register bit is used to indicate whether to execute a mutlipulse on 1 T postion when writing the 4 T mark. For a mark-length of less than 4 T, no registers are needed for this purpose. In accordance with specific embodiments of the present invention, a "1" within a register bit indicates on which T positions to execute a multipulse within a mark, and a "0" indicates on which T positions to not execute a multipulse within the mark (however, it is also within the scope of the present invention that a "0" indicates where to execute a multipulse, and a "1" indicates where to not execute a multipulse). This will now be explained with reference to FIGS. 3B, 4A and 4B.

Figure 3B:
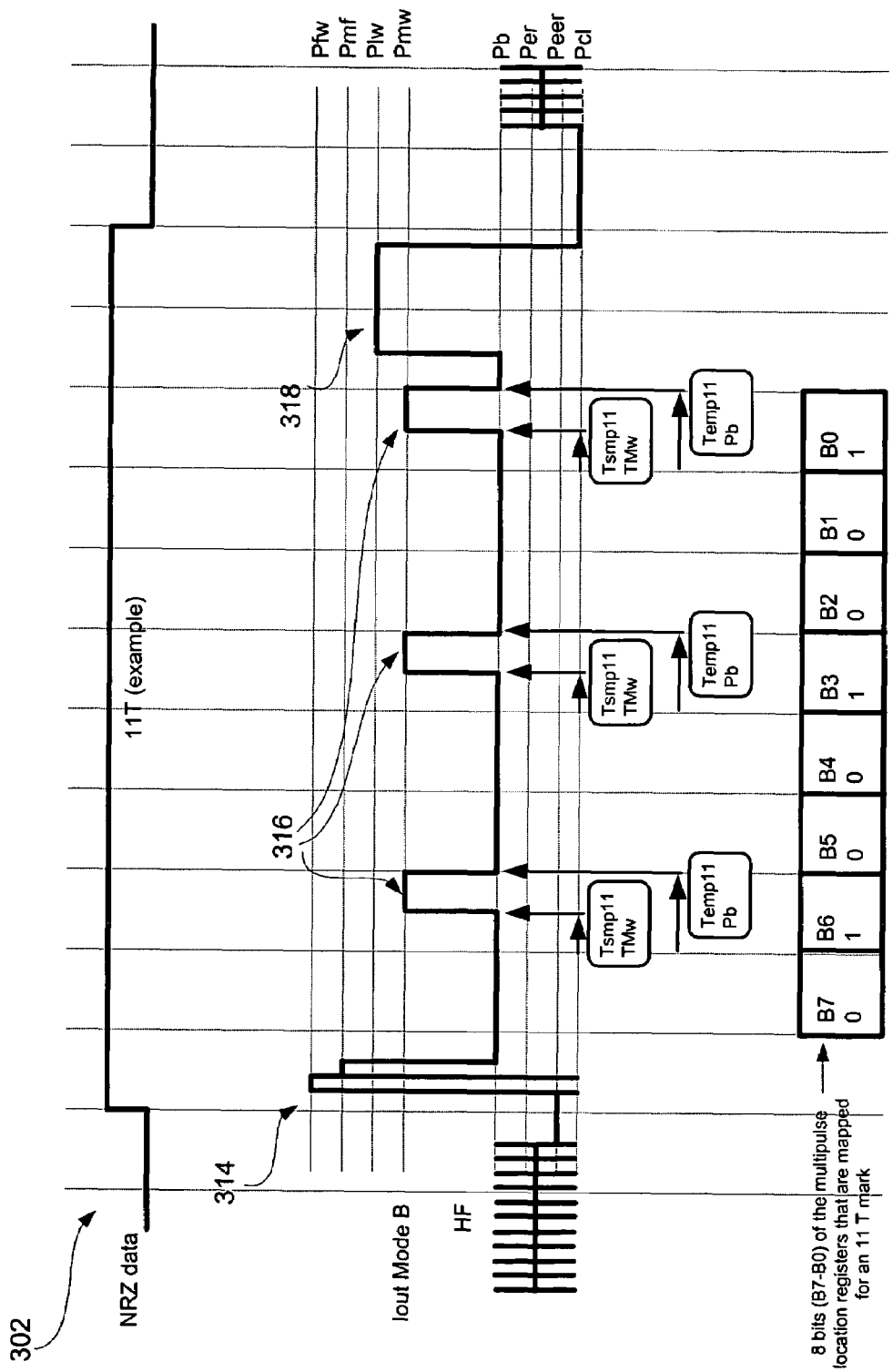
FIG. 3B is a diagram showing how bits (B7-B0) in one of the registers shown in FIG. 2 can be used to specify on which T positions to execute multipulses for a mark-length of 11 T, in accordance with an embodiment of the present invention.

FIG. 3B is a diagram showing a different exemplary drive waveforms for a mark-length of 11 T. In this example, multipulses are executed in only three of the eight possible positions. Also shown in FIG. 3B are the 8 bits (B7-0) that are used to indicate where to execute a multipulse, with a "1" within a register bit indicating on which T positions to execute a multipulse within the 11 T mark, and a "0" indicating on which T positions to not execute a multipulse within the mark. Also shown in FIG. 3B, are two timing events that change laser power, including time start of multipulse (TSMP) and time end of multipulse (TEMP), which in accordance with embodiments of the present invention can be defined as a function of mark-length. In other words, different multipulse timing for different mark-lengths can be specified through various start and end multipulse parameters, which are defined in timing memory 205, as will be appreciated from the discussion below.

FIG. 4A shows ten 8-bit registers (labeled Reg. n to Reg. n+9) that can be used to for the purpose of indicating on which T positions to execute a multipulse for mark-lengths 4 T to 11 T and 14 T (or 12 T+). The "x"s in the registers indicate "don't cares." FIG. 4B shows an arrangement where the "don't cares" can be eliminated, such that only six 8-bit registers are used for the purpose of indicating on which T positions to execute a multipulse for mark-lengths 4 T to 11 T and 14 T, in accordance with an embodiment of the present invention. Other bit arrangements are also possible.

Referring to FIG. 4A, in accordance with an embodiment of the present invention, if there is a "1" located in least significant bit (LSB) of register n, then there will be a multipulse in the first available (and only available) T position of a 4 T mark. As was mentioned above in the discussion of FIGS. 3A and 3B, if mode-A is being used the multipulse will begin on the 1st T of the mark, and if mode-B is being used the multipulse will begin on the 2nd T of the mark. (As will be described in more detail below, flexible write strategies of the present invention allow for the selection of either mode-A or mode-B.) If there is a "0" located in the LSB of register n, then there will no multipulse in the only available T position of a 4 T mark. Referring now to FIG. 4B, in this embodiment it is the most significant bit (MSB) of register n+4 that is used to specify whether or not there should be a multpulse in the first available (and only available) T position of a 4 T mark.

Referring again to FIG. 4A, it can be seen that the four least significant bits (B0, B1, B2 and B3) of register n+3 are used to specify where multipulses are located for a 7 T mark. As was explained above, for a 7 T mark, there are four positions in which multipulses may be located. In the prior art "1 T multipulse strategy", for a 7 T mark there would be four multipulses, one in each of the available positions between the first and last pulse of the 7 T mark. In the prior art "2 T multipulse strategy" there would be two multipulses, one in every other position between the first and last pulse of the 7 T mark. In contrast, using the present invention, there are sixteen different multipulse strategies that can be defined for a 7 T mark (i.e., 0000, 0001, 0010, 0011, 0100, 0101, 0110, 0111, 1000, 1001, 1010, 1011, 1100, 1101, 1110, 1111). Referring to FIG. 4B, in this embodiment it is the four MSBs (B7, B6, B5 and B4) of register n that are used to specify one of the sixteen possible multipulse strategies for a 7 T mark. Thus, it can be appreciated how embodiments of the present invention can be used to define numerous different multipulse strategies. More specifically, where there are n possible locations for a multipulse, embodiments of the present invention allow at least 2^n different multipulse strategies to be defined. Thus, for another example, for an 8 T mark, where there are 5 possible locations for a multipulse (i.e., 8−3=5), there are at least 32 different multipulse strategies that can be defined using embodiments of the present invention (i.e., 2^5=32).

In the tables of FIGS. 4A and 4B, the MSB of each mark-length represent the first available multipulse position, while the LSB is the last available multipulse position in the mark. This can be reversed if desired. FIGS. 4A and 4B illustrate two ways in which multipulse strategies can be mapped to register locations, in accordance with embodiments of the present invention. However, one of ordinary skill in the art will appreciate from the description above that other mappings are also within the spirit and scope of the present invention.

As mentioned above, timing memory 205 can be used to define parameters that specify the start and end of each multipulse, i.e., TSMP (time start multipulse) and TEMP (time end multipulse). Previous write strategy generators were very limited with regards to how TSMP and TEMP parameters could be defined. More specifically, it is believed that previous write strategy generators only allowed a single TSMP and a single TEMP to be defined for all possible mark lengths, or at most two sets: one for even mark lengths and one for odd mark lengths. Also, previous write strategy generators may have also allowed differences between first, second, and subsequent multipulses within a mark, but again with no variation possible for different mark lengths. To provide more flexibility, in accordance with embodiments of the present invention, there can be a different TSMP parameter and TEMP parameter for each mark-length that may include a multipulse (e.g., for each mark length of 4 T or more). This can be implemented, e.g., by storing in timing memory 205 a TSMP parameter and a TEMP parameter for each mark-length that may include a multipulse, as can be appreciated from FIG. 5A. More specifically, FIG. 5A shows eighteen 8-bit memory locations, nine of which are used to store TSMP parameters for the nine different mark-lengths that can include multipulses (e.g., 4 T, 5 T, 6 T, 7 T, 8 T, 9 T, 10 T, 11 T and 12 T+) and nine of which are used to store TEMP parameters for the nine different mark-lengths that can include multipulses. In another embodiment, there can be unique TSMP and TEMP parameters for mark-length 4 T (the shortest mark-length that can include a multipulse); common TSMP and TEMP parameters for mark-lengths between 5 T and 11 T, inclusive; and further unique TSMP and TEMP parameters for mark-lengths of 12 T or more, as is shown in FIG. 5B.

Other multipulse parameters besides TSMP and TEMP may also be defined such that there are unique parameters defined for the different mark-lengths that can include multipulses. Accordingly, additional timing memory 205 can be used to define such other multipulse parameters.

In operation, an NRZ signal is provided to the mark/space detector 202 (e.g., from the host 102), and the mark/space detector 202 detects the length of each mark and space, and provides such information to the sequencer 204. The sequencer 204 uses the mark-to-space and space-to-mark information to access the timing memory 205 that define the first and the last pulse of a mark, as will be described in more detail below, as well as the start and end of each multipulse therebetween, if any. The sequencer 204 also uses the mark-length information to accesses the multipulse location registers (of registers 210) that define location(s) of the multipulse(s) for the detected mark-length. Based upon the mark-to-space or space-to-mark lengths detected by the detector 202, appropriate contents of the timing memory 205 are loaded into the timers 206, which then begin a count down. After a timer 206 counts down to zero, the write current registers 214 output a power level corresponding to the event. The timers 206 can count to fractions of a ChCLK interval, to provide fine control over output waveform timing.

As was explained above, in accordance with embodiments of the present invention, the possible mark-lengths are from 4 to 11 marks, and 12+ marks. One of ordinary skill in the art will appreciate that it is possible to include other specific mark-lengths, or to define additional time events for a multipulse, if desired.

Flexible Write Strategies

In addition to providing for flexible multipulse strategies, embodiments of the present invention also more generally allow for flexible write strategies. As mentioned above, factors such as media type, writing speed, disc format and drive optics necessitate particular write strategies. A key portion of the write strategy is the definition of multipulse location and timing in response to NRZ input data, as was discussed above. Other key portions of the write strategy are defining parameters for the first pulse 314 and last pulse 318 of a drive waveform (see FIGS. 3A and B). Embodiments of the present invention, as will be described below, also allow for the selection of different combinations of modulation codes (e.g. EFM and 1-7PP), timing modes (e.g., mode-A or mode-B), and mark-to space and space-to-mark parameter arrays. Such selections can be performed by a user via the serial interface 114, which, through signal bus 115, can update the contents of the registers 210 and 215 and timing memory 205 of the write strategy generator 124.

Exemplary parameters for defining the first pulse of a mark include timing and power parameters for each of the following space-to-mark events: TSFP (time start first pulse); TEFP (time end first pulse); TMFP (time middle first pulse); and TEER (time end erase pulse). Power parameters that correspond to these timing events are, respectively: Pfw (first write power); Pb (bias power); Pmfw (middle first write power); and Peer (end erase power). The timing parameters are stored in timing memory 205, and the power parameters are stored in write current registers 214.

Exemplary parameters for defining the last pulse mark including timing and power parameters for each of the following mark-to-space parameters: TEMPP (time end multipulse programmable); TSLP (time start last pulse); TELP (time end last pulse); and TECP (time end cooling pulse). Power parameters that correspond to these timing events are, respectively: Pb (bias power); Plw (last write power); Pcl (cool power); and Per (erase power). Per is in a space field.

In accordance with embodiments of the present invention, certain write strategy parameters (including the above mentioned space-to-mark and mark-to-space parameters) are arranged in arrays, examples of which include a 4×4 array, a 5×3 array, and a "use mark-length-only" array. The overall size of such arrays is limited by the amount of timing memory 205 that is dedicated to storing space-to-mark and mark-to-space event parameters. For example, it may be that the timing memory 205 includes a total of 128 8-bit locations that dedicated to storing these particular write strategy events, with 64 of the 8-bit locations dedicated to the space-to-mark events, and the other 64 of the 8-bit locations dedicated to the mark-to-space events. It may also be that each timing event parameter takes up 8-bits (1 byte). In other words, assume the four space-to-mark parameters TSFP, TEFP, TMFP and TEER can be stored in 32-bits (i.e., 4 bytes) and the four mark-to-space parameters TSLP, TELP, TEMPP and TECP can be stored in another 32-bits (i.e. another 4 bytes). Thus, if 64 8-bit locations (i.e., 64 1 byte locations) are dedicated to storing the space-to-mark parameters TSFP, TEFP, TMFP and TEER, and each group of these four parameters takes up 4 bytes, then up to 16 different TSFP, TEFP, TMFP and TEER parameters can be stored. Similarly, if 64 8-bit locations (i.e., 64 1 byte registers) are dedicated to storing the mark-to-space TSLP, TELP, TEMPP and TECP, and each group of these four parameters takes up 4 bytes, then up to 16 different TSLP, TELP, TEMPP and TECP parameters can be stored. As will be understood from the discussion below, embodiments of the present invention provide for greater flexibility of how such parameters can be organized or arranged within the memory space allotted.

In accordance with an embodiment of the present invention, a multi-bit (e.g., 8-bit) write strategy control register enables mix and match selection of timing modes (e.g., mode-A or mode-B), parameter organization (e.g., 4×4 array, 3×5 array, or mark-length-only based list), and modulation codes (e.g., EFM or 17PP). An exemplary write strategy control register is shown in FIG. 6, where:

Bit7 HI (i.e., 1) reduces the size of the parameter arrays by setting the mark-length =6+Marks if using EFM code, or 5+Marks if using 17PP code. This can be used together with Bit3 to further reduce the parameter choices. It does not affect odd/even detection if a 5×3 array is used. It should be set LO (i.e., 0) if using only mark-length based parameters, for it will interfere with proper mark-length detection.

Bit6 is not used in this example.

Bit5 HI will use EFM code for the write strategy. Bit5 LO will use 17PP code for the write strategy.

Bit4 HI sets the timing to mode-B (a 1 T gap between the first pulse and the start of multipulsing). Bit4 LO uses mode-A (no gap between first pulse and the start of multipulsing).

Bit3 HI reduces the size of the parameter arrays by setting the space length=6+Spaces if using EFM code, or 5+Spaces if using 17PP code. This can be used together with Bit7 to further reduce the parameter choices. It does not affect odd/even detection if a 5×3 array is used. It has no effect when using mark-length based parameters.

Bits2-0 define how the parameters will be arranged depending on the Mark/Space combinations, as discussed below with reference to FIG. 7.

As just mentioned, certain bits of the write strategy control register of FIG. 6 are used to define how write strategy parameters are arranged. In a specific example, the three least significant bits (Bits2-0) of the write strategy control register are used for this purpose. However, it is possible to use more or less bits and alternative bit locations (e.g., the three MSBs) to specify how specific write strategy parameters are organized.

Referring to FIG. 7, since in this example there are three bits that are used to define how write strategy parameters are arranged, then there can be up to eight different arrangements (i.e., $2^3=8$). However, in the example shown in FIG. 7, only 3 of the 8 possible bit combinations are used to define write strategy parameter arrangements, while the other 5 bit combinations are shown as being "reserved". However, this need not be the case. Other arrays can also be used, such as an 8×2 array, a "use space length only" array, etc.

An exemplary 4×4 array with EFM code for space-to-mark parameters (TSFP, TEFP, TMFP and TEER) is shown in FIG. 8A, and for mark-to-space parameters (TSLP, TELP, TEMPP and TECP) is shown in FIG. 8B. An exemplary 4×4 array with 17PP code for space-to-mark parameters is shown in FIG. 9A, and for mark-to space-parameters is shown in FIG. 9B. The hexadecimal numbers in the arrays (with X being a variable) are used to represent only the first (or last) nibble. Accordingly, FIGS. 8A, 8B, 9A and 9B illustrate that, in accordance with embodiments of the present invention, a set of space-to-mark parameters (FIG. 8A) and a set of mark-to-space parameters (FIG. 8B) can be stored for one type of modulation code that can be used (e.g., EFM), while separate sets of space-to-mark (FIG. 9A) and mark-to-space parameters (FIG. 9B) can be stored for a different modulation code that can be used (e.g., 17PP). Alternatively, the same memory addresses are shared for the different modulation codes (e.g., EFM, 17PP, etc.) and the user reprograms these registers according to the code they want to use.

The variable "X" is used to avoid listing a different table for each parameter. For example, TSFP could encompass addresses 70 h-7 Fh, TEFP could encompass 60 h-6 Fh, etc. To avoid listing all these possibilities (i.e., for convenience), a single array is listed for all mark-space and space-mark parameters using X0-XFh. As was explained above with reference to FIG. 6, a bit within the write strategy control register can be set to indicate which modulation code is to be implemented (e.g., EFM or 17PP).

An exemplary 5×3 array with EFM code for space-to-mark parameters is shown in FIG. 10A, and for mark-to-space parameters is shown in FIG. 10B. An exemplary 5×3 array with 17PP code for space-to-mark parameters is shown in FIG. 11A, and for mark-to-space parameters is shown in FIG. 11B. A comparison of FIGS. 10A, 10B, 11A and 11B to FIGS. 8A, 8B, 9A and 9B illustrates that space-to-mark and mark-to-space parameters can be organized in different manners (different arrays), as selected by the user. As was explained above with reference to FIGS. 6 and 7, bits of the write strategy control register can be set to indicate which organization (array) of parameters is to be implemented (e.g., 4×4 array, or 5×3 array).

Another possible arrangement of space-to-mark and mark-to-space parameters is illustrated in FIGS. 11A, 11B, 12A and 12B. More specifically, an exemplary mark-length-only with EFM code for space-to-mark parameters (TSFP, TEFP, TMFP and TEER) is shown in FIG. 12A, and for mark-to-space parameters (TSLP, TELP, TEMPP and TECP) is shown in FIG. 12B. An exemplary mark-length-only array with 17PP code for space-to-mark parameters is shown in FIG. 13A, and for mark-to-space parameters is shown in FIG. 13B.

Referring again back to FIGS. 6 and 7, the 3 least significant bits of the mode control register can be set to specify how write strategy parameters are to be arranged. For example, if Bits2-0 are "000" then they will be arranged in a 4×4 array, if Bits2-0 are "001" then they will be arranged in a 5×3 array, and if Bits2-0 are "010" then they will be arranged in a use "mark-length-only" array. As mentioned above, other arrangements are also possible, and within the spirit and scope of the present invention. It is also possible that additional and/or different space-to-mark parameters and mark-to-space parameters than those discussed above can be defined in these arrays.

Referring again to FIG. 2, when the NRZ signal is provided to the mark/space detector 202 (e.g., from the host 102), the mark/space detector 202 detects the length of each mark and space, and provides such information to the sequencer 204. The sequencer 204 uses the mark and space length information to access specific locations of the registers 210 that define the first and the last pulse of a mark. As was previously explained in detail, the sequencer also use mark length information to access registers that define the multipulses (if any) that are to be included between the first and last pulses. As just explained above, the mark-to-space and space-to-mark parameters can be arranged within the timing memory 205 in one of a plurality of different ways (e.g., 4×4, 5×3 or mark-length-only arrays), one of which is selected or specified in the write strategy control register. The sequencer 204 loads the timers 206 with timing parameters such as TSFP, TEFP, TMFP, TEER, TSLP, TELP, TEMPP or TECP and starts the timers upon receiving a proper stimulus. After a counter counts down to zero, the write current registers 214 output an appropriate power level.

In summary, a portion of timing memory 205 is dedicated to storing space-to-mark and mark-to-space event parameters that define a first pulse and a last pulse of a mark. A write strategy control register includes a plurality of bits that are used to specify how this portion of timing memory 205 is organized. For example, the memory can be organized as 4×4, 5×3 and mark-length-only arrays, wherein the bits within the write strategy control register can be used to select among the arrays. The write strategy control register also includes at least one bit that is used to specify either a mode-A or a mode-B timing mode. In mode-A, a first multipulse location begins on the 1st T of a mark, and in mode-B a first multipulse begins on the 2nd T of a mark. Additionally, the write strategy control register also includes at least one bit that is used to specify either an EFM or a 17PP modulation code. The write strategy control register enables a selection of different combinations of event registers organization, timing mode and modulation code. In other words, the write strategy control register enables a selection of one of at least two different ways in which timing memory is organized, whether a first multipulse location begins on the 1st T of a mark or on the 2nd T of a mark, and whether a first or a second modulation code is used when writing.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Unless otherwise specified, alternate boundaries can be defined so long as the specified functions and relationships thereof are appropriately performed. Any such alternate boundaries are thus within the scope and spirit of the claimed invention.

The breadth and scope of the present invention should not be limited by any of the above-described exemplary embodiments, but should be defined only in accordance with the following claims and their equivalents.

What is claimed is:

1. A laser driver system that provides flexible multipulse strategies for use when writing marks on a medium,
wherein each mark has a mark-length,
wherein each mark is written using a first pulse which defines a starting edge of the mark, a last pulse which defines an ending edge of the mark, and zero, one or more multipulses between the first and last pulses, and
wherein when marks for a plurality of different mark-lengths are written using one or more multipulses between the first pulse and the last pulse, the one or more multipulses can have different timing parameters than the first pulse and the last pulse, the laser driver system comprising:
a plurality of multipulse location registers dedicated to storing multipulse location information;
wherein each mark-length, of a plurality of different mark-lengths that are written using at least one multipulse, is mapped to one or more bit location within said multipulse location registers, such that a unique multipulse execution strategy can be defined for each mark-length of the plurality of different mark-lengths;
wherein each bit location within said multipulse location registers can contain a first type of bit or a second type of bit, and wherein said first type of bit indicates where to execute a multipulse, and said second type of bit indicates where to not execute a multipulse;
wherein the maximum number of multipulses between the first and last pulses of a mark having a mark-length greater than 3T is equal to the mark-length of the mark minus three; and
wherein N-3 bit locations of said multipulse location registers are mapped to each mark-length that is between 4T and 11T in length, inclusive, and no bit locations of said multipulse location registers are mapped to mark-lengths of 3T or less, where N specifies a mark-length.

2. The system of claim 1, further comprising:
a mark/space detector to detect mark-lengths and space-lengths in an NRZ signal; and
a sequencer that receives mark-length and space-length information from said mark/space detector;
wherein in response to receiving information indicative of a mark-length from said mark/space detector, said sequencer accesses one or more bit location within said multipulse location registers, in order to implement the multipulse execution strategy that corresponds to said mark-length.

3. A laser driver system that provides flexible multipulse strategies for use when writing marks on a medium,
wherein each mark has a mark-length,
wherein each mark is written using a first pulse which defines a starting edge of the mark, a last pulse which defines an ending edge of the mark, and zero, one or more multipulses between the first pulse and the last pulse of the mark, and
wherein when the marks for a plurality of different mark-lengths are written using one or more multipulses between the first pulse and the last pulse, the multipulses have different timing parameters than the first pulse and the last pulse,
the laser driver system comprising:
timing memory to store TSMP (time staff of multipulse) and TEMP (time end of multipulse) parameters;
wherein unique TSMP and TEMP parameters are stored, within said timing memory, for each mark-length of the plurality of different mark-lengths that are written using one or more multipulses.

4. The system of claim 3, further comprising:
a plurality of multipulse location registers dedicated to storing multipulse location information;
a mark/space detector to detect mark-lengths and space-lengths in an NRZ signal; and
a sequencer that receives mark-length and space-length information from said mark/space detector;
wherein in response to receiving information indicative of a mark-length from said mark/space detector, said sequencer
accesses one or more bit location within said multipulse location registers, in order to implement a multipulse execution strategy that corresponds to said mark-length, and
accesses said timing memory in order to determine the TSMP and TEMP parameters that correspond to said mark-length.

5. The system of claim 1, further comprising:
timing memory to store multipulse timing parameters;
wherein at least one unique multipulse timing parameter is stored, within said timing memory, for each mark-length of said plurality of different mark-lengths that result in at least one multipulse.

6. The system of claim 5, further comprising:
a mark/space detector to detect mark-lengths and space-lengths in an NRZ signal; and
a sequencer that receives mark-length and space-length information from said mark/space detector;
wherein in response to receiving information indicative of a mark-length from said mark/space detector, said sequencer
accesses one or more bit location within said multipulse location registers, in order to implement the multipulse execution strategy that corresponds to said mark-length, and
accesses said timing memory in order to determine the at least one unique multipulse timing parameter that correspond to said mark-length.

7. The system of claim 1, wherein the plurality of multipulse location registers includes eight 8-bit registers, each of which corresponds to one of a 4 T, 5 T, 6 T, 7 T, 8 T, 9 T, 10 T and 11 T mark.

8. The system of claim 7, wherein the plurality of multipulse location registers includes two additional 8-bit registers that correspond to a 12+mark.

9. The system of claim 1, wherein five 8-bit multipulse location registers include all of the bit locations used to map each mark-length that is between 4 T and 11 T in length, inclusive.

10. The system of claim 1, wherein six 8-bit multipulse strategy registers include all of the bit locations used to map each mark-length that is between 4 T and 11T in length, inclusive, and a mark-length of 14 T.

11. A laser driver system that provides flexible multipulse strategies that can be used when writing marks on a medium,
wherein each mark has a mark-length,
wherein each mark can be written using a first pulse which defines a starting edge of the mark, a last pulse which defines an ending edge of the mark, and zero, one or more multipulses between the first and last pulses, and
wherein when the marks for a plurality of different mark-lengths are written using one or more multipulses between the first pulse and the last pulse, the multipulses have different timing parameters than the first pulse and the last pulse,
the laser driver system comprising:
timing memory to store multipulse timing parameters;

wherein each mark-length, of the plurality of different mark-lengths that are written using one or more multipulses, is mapped to at least one address within said timing memory, such that at least one unique multipulse timing parameter is definable for each mark-length of the plurality of different mark-lengths that are written using one or more multipulses.

12. The system of claim 11, further comprising:
a mark/space detector to detect mark-lengths and space-lengths in an NRZ signal; and
a sequencer that receives mark-length and space-length information from said mark/space detector;
wherein in response to receiving information indicative of a mark-length from said mark/space detector, said sequencer accesses at least one address within said timing memory, in order to determine the at least one unique multipulse timing parameter that corresponds to said mark-length.

13. A laser driver system that provides flexible multipulse strategies that can be used when writing marks on a medium,
wherein each mark has a mark-length,
wherein each mark can be written using a first pulse which defines a staffing edge of the mark, a last pulse which defines an ending edge of the mark, and zero, one or more multipulses between the first and last pulses, and
wherein when the marks for a plurality of different mark-lengths are written using one or more multipulses between the first pulse and the last pulse, the multipulses have different timing parameters than the first pulse and the last pulse,
the laser driver system comprising:
timing memory to store multipulse timing parameters;
a mark/space detector to detect mark-lengths and space-lengths in an NRZ signal; and
a sequencer that receives mark-length and space-length information from said mark/space detector;
wherein in response to receiving information indicative of a mark-length from said mark/space detector, said sequencer accesses at least one address within said timing memory, in order to determine the at least one unique multipulse timing parameter that corresponds to said mark-length;
wherein said timing memory stores TSMP (time start of multipulse) and TEMP (time end of multipulse) parameters, wherein unique TSMP and TEMP parameters are stored, within said timing memory, for each mark-length of the plurality of different mark-lengths that are written using one or more multipulses;
wherein in response to receiving information indicative of a mark-length from said mark/space detector, said sequencer accesses said timing memory in order to determine the TSMP and TEMP parameters that correspond to said mark length.

14. A laser driver system that provides flexible multipulse strategies that for use when writing marks on a medium,
wherein each mark has a mark-length,
wherein each mark is written using a first pulse which defines a starting edge of the mark, a last pulse which defines an ending edge of the mark, and zero, one or more multipulses between the first and last pulses, and
wherein when the marks for a plurality of different mark-lengths are written using one or more multipulses between the first pulse and the last pulse, the multipulses have different timing parameters than the first pulse and the last pulse,
the laser driver system comprising:
a mark/space detector to detect mark-lengths and space-lengths in an NRZ signal;
a sequencer that receives mark-length and space-length information from said mark/space detector;
a plurality of multipulse location registers dedicated to storing multipulse location information, wherein
each mark-length, of the plurality of different mark-lengths that are written using one or more multipulses, is mapped to one or more bit location within said multipulse location registers, such that a unique multipulse execution strategy is definable for each mark-length of the plurality of different mark-lengths that are written using one or more multipulses; and
each bit location within said multipulse location registers can contain a first type of bit or a second type of bit, and wherein said first type of bit indicates where to execute a multipulse, and said second type of bit indicates where to not execute a multipulse; and
timing memory to store multipulse timing parameters, wherein unique multipulse timing parameters are stored, within said timing memory, for each mark-length of the plurality of different mark-lengths that are written using one or more multipulses;
wherein in response to receiving information indicative of a mark-length from said mark/space detector, said sequencer
accesses one or more bit location within said multipulse location registers, in order to implement the multipulse execution strategy that corresponds to said mark-length, and
accesses said timing memory in order to determine the unique multipulse timing parameters that correspond to said mark-length.

15. The system of claim 14, wherein said timing memory stores TSMP (time staff of multipulse) and TEMP (time end of multipulse) parameters, wherein unique TSMP and TEMP parameters are stored, within said timing memory, for each mark-length of the plurality of different mark-lengths that are written using one or more multipulses;
wherein in response to receiving information indicative of a mark-length from said mark/space detector, said sequencer accesses said timing memory in order to determine the TSMP and TEMP parameters that correspond to said mark length.

16. A laser driver system that provides flexible multipulse strategies for use when writing marks on a medium,
wherein each mark has a mark-length,
wherein each mark is written using a first pulse which defines a staffing edge of the mark, a last pulse which defines an ending edge of the mark, and zero, one or more multipulses between the first pulse and the last pulse of the mark, and
wherein when the marks for a plurality of different mark-lengths are written using one or more multipulses between the first pulse and the last pulse, the multipulses have different timing parameters than the first pulse and the last pulse,
the laser driver system comprising:
timing memory to store TSMP (time staff of multipulse) and TEMP (time end of multipulse) parameters;
wherein unique TSMP and TEMP parameters are stored, within said timing memory, for each mark-length of at least three of the different mark-lengths that are written using one or more multipulses.

* * * * *

UNITED STATES PATENT AND TRADEMARK OFFICE
CERTIFICATE OF CORRECTION

PATENT NO. : 7,492,686 B2  
APPLICATION NO. : 11/233193  
DATED : February 17, 2009  
INVENTOR(S) : Miguel Gabino Perez et al.

It is certified that error appears in the above-identified patent and that said Letters Patent is hereby corrected as shown below:

Claim 3, at Column 13, line 62, replace "staff" with --start--;

Claim 13, at Column 15, line 23, replace "staffing" with --starting--;

Claim 14, at Column 15, line 56, delete "that";

Claim 15, at Column 16, line 36, replace "staff" with --start--;

Claim 16, at Column 16, line 50, replace "staffing" with --starting--; and

Claim 16, at Column 16, line 60, replace "staff" with --start--.

Signed and Sealed this

Twenty-fifth Day of August, 2009

David J. Kappos
*Director of the United States Patent and Trademark Office*